United States Patent
Ickman et al.

(10) Patent No.: US 9,893,903 B2
(45) Date of Patent: Feb. 13, 2018

(54) CREATING CONNECTIONS AND SHARED SPACES

(71) Applicant: MICROSOFT CORPORATION, Redmond, WA (US)

(72) Inventors: Steven Ickman, Snoqualmie, WA (US); Lars Liden, Seattle, WA (US); Hai Liu, Sammamish, WA (US); William Portnoy, Woodenville, WA (US); Shahin Shayandeh, Kirkland, WA (US); Janice Von Itter, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 184 days.

(21) Appl. No.: 14/187,535

(22) Filed: Feb. 24, 2014

(65) Prior Publication Data
US 2015/0244539 A1 Aug. 27, 2015

(51) Int. Cl.
*H04L 12/18* (2006.01)
*H04L 12/58* (2006.01)
(Continued)

(52) U.S. Cl.
CPC ......... *H04L 12/1827* (2013.01); *G06Q 50/01* (2013.01); *H04L 51/24* (2013.01);
(Continued)

(58) Field of Classification Search
CPC ....... H04L 51/066; H04L 51/26; H04L 51/38; H04L 61/1535; H04L 61/2069;
(Continued)

(56) References Cited

U.S. PATENT DOCUMENTS

| 5,583,993 A | 12/1996 | Foster et al. |
| 8,266,534 B2 | 9/2012 | Curtis et al. |

(Continued)

FOREIGN PATENT DOCUMENTS

WO 2013156092 A1 10/2013

OTHER PUBLICATIONS

"International Search Report and Written Opinion Issued in PCT Patent Application No. PCT/US2015/016724", dated Jun. 19, 2015, 11 Pages.

(Continued)

*Primary Examiner* — David Lazaro
*Assistant Examiner* — Berhanu Shitayewoldetsadi
(74) *Attorney, Agent, or Firm* — Shook, Hardy & Bacon L.L.P.

(57) ABSTRACT

Methods, computer systems, and computer-storage media are provided for connecting devices. Shared spaces may be created among one or more users and/or devices. Based on various factors including locations, histories among users, time of day, etc., spaces may be created among users such that content may be shared within the shared space. The spaces may be created using multiple technologies such that one user may connect to the space via a first identifier format while a second user may connect to the space via a second identifier format. Once created, content may be shared with one or more users of the space. Depending on privacy and/or security settings of the space, any user may invite other users to join the space. The content may be available to any participant once the space has terminated.

20 Claims, 11 Drawing Sheets

(51) Int. Cl.
| | |
|---|---|
| H04L 29/06 | (2006.01) |
| G06Q 50/00 | (2012.01) |
| H04N 21/4788 | (2011.01) |
| H04N 7/15 | (2006.01) |
| H04W 4/08 | (2009.01) |
| H04W 4/20 | (2018.01) |
| H04L 29/08 | (2006.01) |

(52) U.S. Cl.
CPC ........ *H04L 65/1069* (2013.01); *H04L 67/146* (2013.01); *H04L 67/148* (2013.01); *H04N 7/15* (2013.01); *H04N 21/4788* (2013.01); *H04W 4/08* (2013.01); *H04W 4/206* (2013.01)

(58) Field of Classification Search
CPC ..... H04L 61/6018; H04L 63/00; H04L 63/10; H04L 65/00; H04L 65/1016; H04L 65/1063; H04L 65/1066; H04L 65/1083; H04L 67/10; H04L 69/329
USPC ............................. 709/204, 206; 705/14.26
See application file for complete search history.

(56) References Cited

U.S. PATENT DOCUMENTS

| | | | | |
|---|---|---|---|---|
| 2005/0055450 A1* | 3/2005 | Gang | ................ | G06F 17/30867 709/228 |
| 2006/0031442 A1* | 2/2006 | Ashley | ................... | H04L 67/02 709/223 |
| 2007/0208806 A1* | 9/2007 | Mordecai | ............... | G06Q 10/10 709/204 |
| 2008/0089344 A1* | 4/2008 | Jansson | ................ | H04L 67/141 370/395.2 |
| 2008/0114844 A1 | 5/2008 | Sanchez et al. | | |
| 2008/0256190 A1* | 10/2008 | Ryan | ................... | H04L 12/1831 709/206 |
| 2012/0209686 A1* | 8/2012 | Horowitz | ............... | H04L 67/02 705/14.26 |
| 2013/0066963 A1* | 3/2013 | Odio | ...................... | G06Q 10/10 709/204 |
| 2013/0132477 A1 | 5/2013 | Bosworth et al. | | |
| 2013/0185368 A1* | 7/2013 | Nordstrom | ............. | H04L 51/32 709/206 |

OTHER PUBLICATIONS

Chen, et al., "Enabling Resource-Aware Ubiquitous Applications for Personal Cloud with a Pairing Device Framework", In Journal of Internet Services and Information Security (JISIS), vol. 3, Issue1/2 , Feb. 2013, 18 pages.

Privitera, et al., "Virtual Meeting Analyzer: A Web Application to Visualize and Analyze Social Networks Emerging in Group Meetings", In Proceeding of the PsychNology Journal, vol. 10, Issue 1, Apr. 2012, 14 pages.

"Adobe® Connect™ Mobile 2.0 Getting Started", Published on: May 12, 2013, Available at: http://wwwimages.adobe.com/www.adobe.com/content/dam/Adobe/en/products/adobec.

Ninomiyaa, et al., "Near Friends Communication Encouragement System Using NFC and SNS", In Proceeding of the IIAI International Conference on Advanced Applied Informatics, Sep. 20, 2012, 4 pages.

* cited by examiner

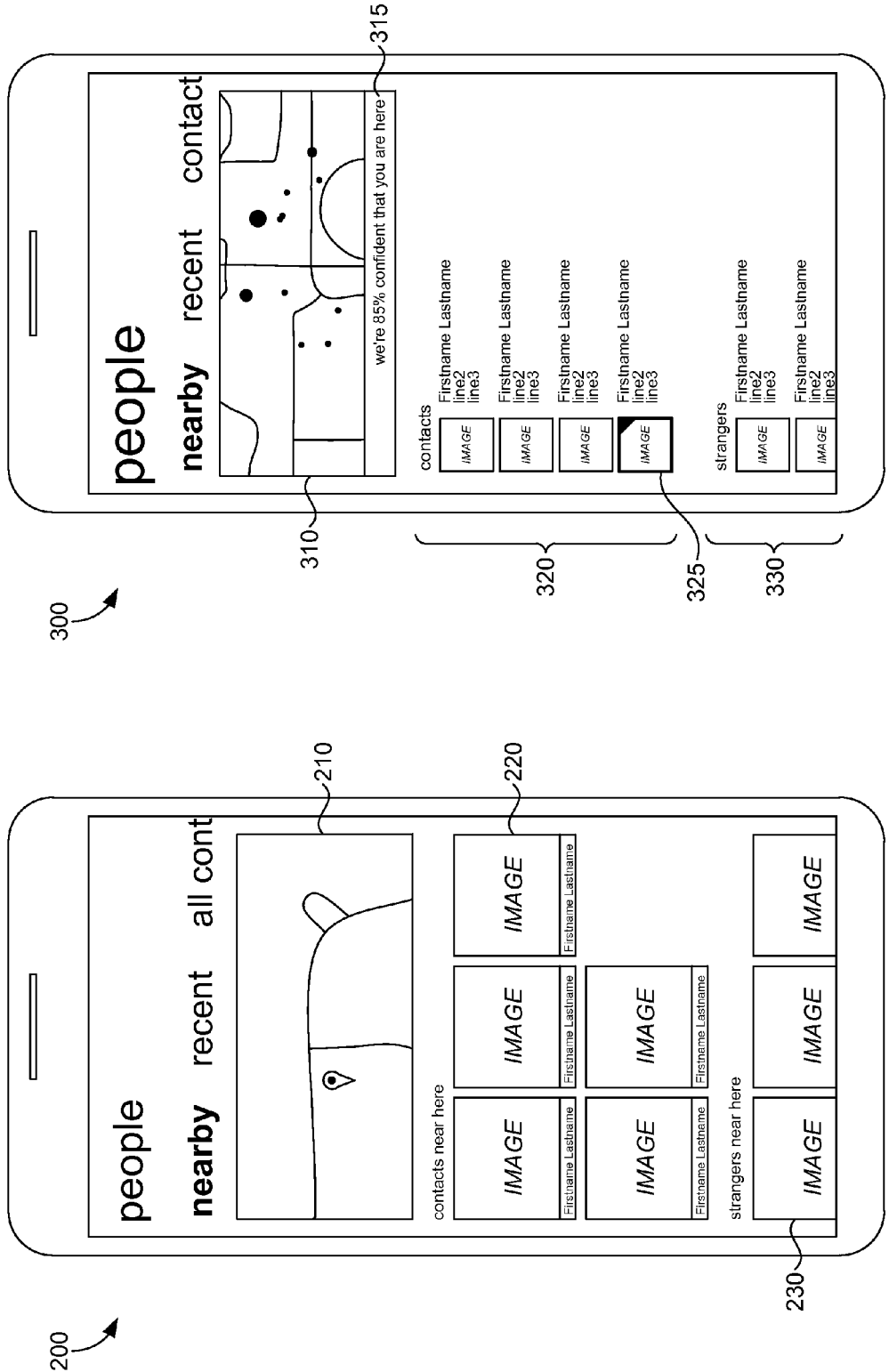

US 9,893,903 B2

CREATING CONNECTIONS AND SHARED SPACES

BACKGROUND

Establishing connections among devices is a common practice when a user desires to connect a device to things that are external to the device. For example, a user may desire to connect a mobile phone to the Internet. Various technologies exist to facilitate such connections. Quick response (QR) codes are associated with data and allow a user to access that data easily. QR codes typically have to be accessed by a present, in the moment scan. In other words, a user typically needs to physically encounter the code. Furthermore, QR codes are associated with static data meaning that a scan of a particular QR code directs a user to the same data every time it is scanned. For instance, assuming a QR code is associated with a URL, the QR code is always associated with that same URL. The URL encoded in the QR code can direct the user to a specific destination (e.g., a website) that is related to a physical location of the QR code. Other state of the art technologies may be leveraged to facilitate interconnection of devices such as, for example, Bluetooth®, URL links, Near Field Communication (NFC) chips, and the like. NFC, like QR codes, is a physical access option meaning a user needs to have physical access to another NFC device to receive information encoded in NFC chips to establish a connection. For example, connection information for a wireless access point may be encoded in the NFC chip and a device can read the information to connect to the network. Each of the existing options uses either a physical action to establish a connection (e.g., physically scan QR code or NFC device) or a time-consuming set-up that may need to be reestablished with each new connection (e.g., Bluetooth).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-storage media for, among other things, creating connections. The present invention seeks to enable connections between devices and/or users that are automatically created and easily accessible via various technologies. Potential connections, that is, connections that are not yet created but may be desirable based on a variety of factors, may be automatically detected. Connections may be desirable based on user location, a location of other users that are near the user (or within a predetermined distance from the user), a time of day, a history of connections between a group of users, and the like.

Accordingly, in one embodiment, the present invention is directed to one or more computer-storage media having computer-executable instruction embodied thereon that, when executed by one or more computing devices, perform a method of connecting devices. The method comprises, identifying a user location of an initial user at a first time; identifying a location of a plurality of other users at the first time; communicating a session identifier to the plurality of other users via a plurality of session identifier formats such that a first user connects to a shared space session using a first session identifier format and a second user connects to the shared space session using a second session identifier format different than the first session identifier format; and displaying the session identifiers to the first user in the first session identifier format and the second user in the second session identifier format.

In another embodiment, the presented invention is directed to a computerized method for connecting devices. The method comprises identifying a user location associated with a first user at a first time; identifying one or more existing shared space sessions, wherein a shared space session is a connection between one or more user devices; connecting the first user to a first shared space session of the one or more existing shared space sessions; and displaying an option to broadcast content within the first shared space session to the first user.

In yet another embodiment, the present invention is directed to one or more computer-storage media having computer-executable instruction embodied thereon that, when executed by one or more computing devices, perform a method of connecting devices. The method comprises identifying a user location associated with a first user at a first time; identifying one or more locations associated with one or more subsequent users, wherein the one or more locations are within a predetermined distance from the user location of the first user; communicating a notification to the one or more subsequent users that the first user is inviting the one or more subsequent users to connect in a shared space session; associating a group identifier to the first user and other participants in the shared space session, wherein other participants includes at least one user of the one or more subsequent users; identifying shared content associated with the shared space session; terminating the shared space session; and saving the shared content associated with the shared space session such that the first user and other participants are able to access the shared content subsequent to termination of the shared space session.

BRIEF DESCRIPTION OF THE DRAWINGS

The present invention is described in detail below with reference to the attached drawing figures, wherein:

FIGS. 2-15 depict illustrative screen displays, in accordance with an embodiment of the present invention;

DETAILED DESCRIPTION

Figure 1:
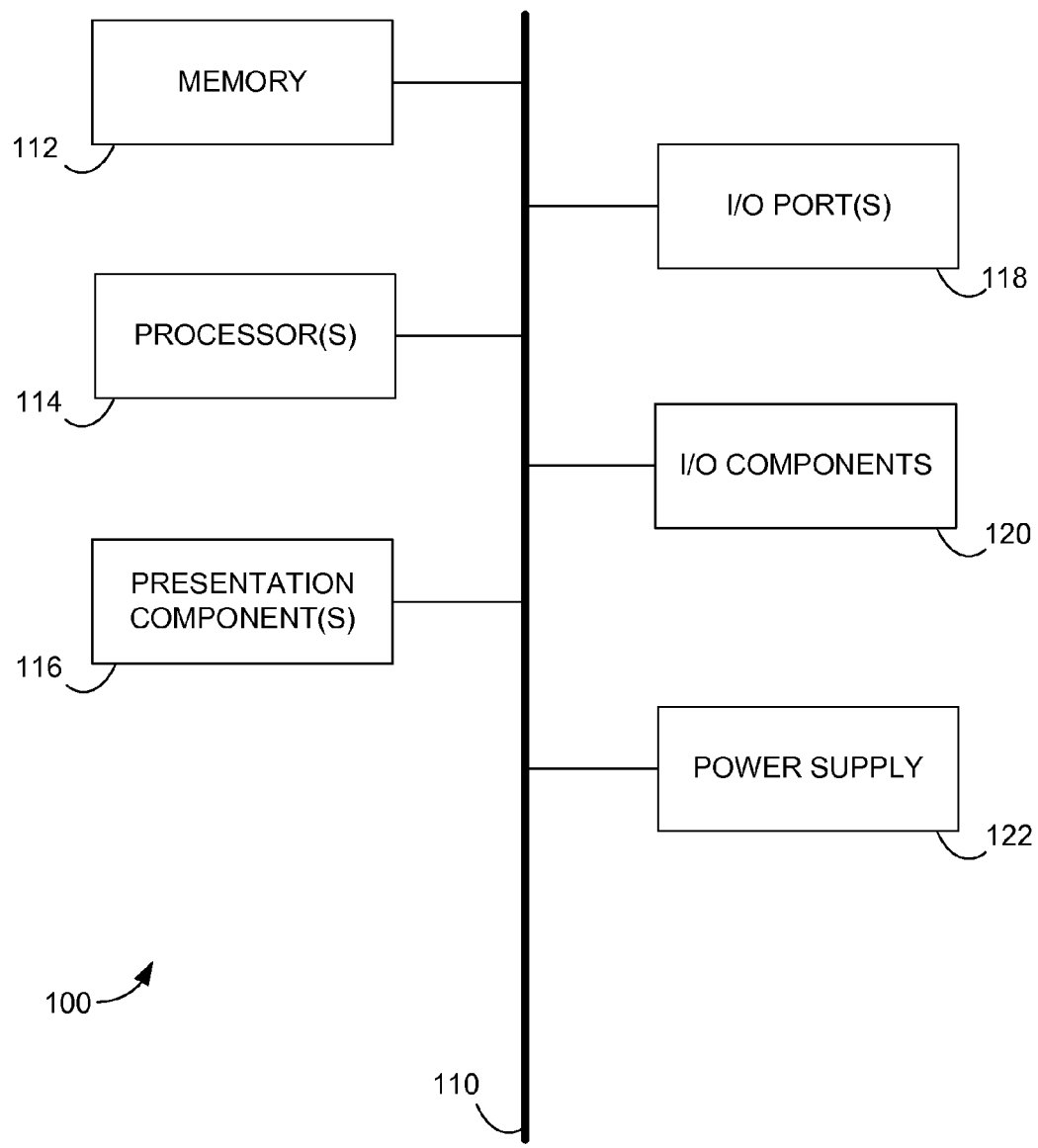
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-storage media for, among other things, creating connections. Connections may be automatically created between devices and/or users that are easily accessible via various technologies. Potential connections, that is, connections that are not yet created but may be desirable based on a variety of factors, may be automatically detected. Connections may be desirable based on user location, a location of other users that are near the user (or within a predetermined distance from the user), a time of day, a history of connections between a group of users, and the like.

Various technologies may be utilized to establish connections, as will be described in greater detail below. In short, connections may be accessed using many technologies rather than a single access connection. For example, connections may be accessed via QR codes, URL links, Bluetooth connections, NFC connections, and the like. So, a first user may access a connection using one technology, for example, a unique QR code, while a second user may access the same connection using another technology such as an NFC connection. Session identifiers may be communicated to various users in one or more formats. As in the previous example, the first user scanned a QR code, a first session identifier format, and a second user received a different technology, a second identifier format. Session identifiers may be communicated to any user, regardless of location, to join a shared space session as the sessions are hosted in a cloud environment. Furthermore, session identifiers may be "shared" by any member of the shared space session such that any member, within the parameters of security settings, may invite other participants.

Additionally, access technologies may be updated such that selection thereof navigates a user to a different destination at a later time. For instance, the first user selected a unique QR code to establish a connection in the previous example. The first user may be presented, at a later time, a second unique QR code that navigates the first user to a different connection.

The connections described herein may be referred to as shared space sessions. Shared space sessions, as used herein, refer generally to connections among users and/or devices where content is shared. Content may include, but is not limited to, text, audio files, video files, images, documents, and the like. The connections may be automatically detected and even automatically created.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-usable instructions, including computer-usable or computer-executable instructions such as program modules, being executed by a computer or other machine, such as a personal data assistant, a smart phone, a tablet PC, or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excludes signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like. An NUI processes air gestures, voice, or other physiological inputs generated by a user. These inputs may be interpreted as search prefixes, search requests, requests for interacting with intent suggestions, requests for interacting with entities or subentities, or requests for interacting with advertisements, entity or disambiguation tiles, actions, search histories, and the like presented by the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Aspects of the subject matter described herein may be described in the general context of computer-executable instructions, such as program modules, being executed by a computing device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "server" is often used herein, it will be recognized that this term may also encompass a search engine, a Web browser, a cloud server, a set of one or more processes distributed on one or more computers, one or more stand-alone storage devices, a set of one or more other computing or storage devices, a combination of one or more of the above, and the like.

In application, shared space sessions may be created between users, devices, and the like. Shared space sessions, as described above, refer generally to connections where content is shared. Exemplary shared space sessions may include chat sessions between users, business meetings, and the like. Initially, shared space sessions are detected. This may be an automatic process. A user device may be equipped with an application that either automatically detects shared space sessions, or an opportunity for a shared space session, or completes detection upon receiving a user indication. Alternatively, a user device may include instructions thereon (e.g., as part of the operating system) that automatically detects said sessions or completes detection upon receipt of a user indication. An opportunity for a shared space session, or potential shared space session, refers generally to a connection that is not currently enabled or existing but may be recommended or desired based on time and location. For instance, if a group of users is detected to be within a predetermined distance from each other at a specific time that is historically related to meetings between the users, a potential shared space session may be detected. In other embodiments, a listing of users that are within a predetermined distance from a user may be displayed to the user as potential connections, regardless of historical connections.

Automatic detection may occur in many ways depending on settings associated with a user and/or a user device. For instance, a user may designate that the device constantly look for existing shared space sessions or the opportunity for potential shared space sessions. This may happen when a user device is equipped to run instructions constantly, for example, in the background. Alternatively, automatic detection may be initiated upon a user accessing an application to detect/create connections such that the application automatically begins identifying connections and potential connections upon access without additional user indications. Alternatively, a user may indicate that automatic detection is not enabled such that a device does not constantly run detection mechanisms in the background and/or an application does not automatically identify connections upon access. Rather, in the case where automatic detection is disabled, a user would either (1) open an application and input a further indication that the application should identify connections or (2) input an indication that a device should enable detection mechanisms that run in the background, but only upon receipt of the user indication to enable said mechanisms.

Whether automatic or user-initiated, shared space sessions or potential shared space sessions may be identified and displayed to a user. FIG. 2 illustrates an exemplary user interface 200 depicting a potential shared space session. The user interface 200 includes a map area 210 that includes, among other things, at least a location of a user associated with the device (hereinafter, User A) and one or more locations associated with other users determined to be within a predefined distance from User A. The predefined distance may be any distance indicated by User A.

The other users may be displayed to User A in categories such as contacts and strangers. Contacts, as used herein, refer generally to users that are associated with one another, particularly User A, based on shared information among the users. For example, contacts are typically stored in mobile phones and include data such as name, phone number, email address, or the like. Strangers, as used herein, refer generally to users that are not associated with one another. This may be determined based on a lack of shared information including a lack of a contact saved in a mobile device. As illustrated in FIG. 2, contacts are displayed in contact area 220 and strangers are displayed in stranger area 230. This is simply an exemplary display and users may be displayed in a variety of ways including, but not limited to, lists of names, arrangements ordered by location (e.g., the user closest to User A is displayed at the top of a list and the user farthest from User A is displayed at the bottom of the list, regardless of contact and stranger status), arrangements ordered by location within contact and stranger displays (e.g., the contact area 220 may be ordered from closest to farthest contact and the stranger area 230 may also be ordered from closest to farthest stranger, or any arrangement desirable by the user), or the like. Additionally, images are associated with each contact in FIG. 2. The images may be images pulled from social media associated with the user, images assigned to the users by User A, images saved in User A's contact (regarding contact users), and the like. Images are not required in user interface 200. FIG. 2 may be the interface displayed to User A whether the detection was automatic or in response to a user indication.

FIG. 3 illustrates an exemplary user interface 300 for creating a connection. The user interface includes a map area 310, a confidence rating area 315, a contacts area 320, and a stranger area 330. As described with reference to FIG. 2, the users near User A may be displayed in a list view as shown in FIG. 3. Use of the word 'near' as used in this description refers to users that are within a predetermined distance from User A, or the user associated with the user device detecting the user locations.

Map area 310 may display a location associated with User A, one or more locations associated with other users near User A, and the like. The locations may be illustrated as different sizes based on a confidence level associated with each location. For instance, the larger the circle, the higher the confidence level of the location. This may be indicated in any way desired by a user. For instance, confidence levels may be illustrated using colors, other designs, numerals, and the like. In user interface 300 a confidence rating area 315 is illustrated to depict a confidence level associated with Users A's location.

When presented with other users that are near User A, User A may want to establish a connection with one or more other users. FIG. 3 illustrates a selection by User A of another user 325 to establish a connection. User A may select multiple users. Upon selection of a user, the interface may be directed to user interface 400 of FIG. 4. This may display a profile associated with the selected user (e.g., user 325). The profile includes an action area 410 that includes various actions available to User A including, but not limited to, calling the selected user 325, emailing the selected user 325, sending a text message to the selected user 325, and the like. The profile may also include a casting area 420 enabling User A to begin broadcasting to the selected user. This would establish a shared space session between User A and the selected user so that content (text, voice, images, etc.) may be shared between users in the shared space session. Content may be shared among any users that are connected to the shared space session. So, if User A had selected multiple users, not just user 325, each user selected would have access to the content. Furthermore, users that are connected to the shared space session have the option to invite other users to the connection. For example, User A selected user 325 and user 325 could then invite another user to join and, thus, access content shared during the session.

Figure 4:
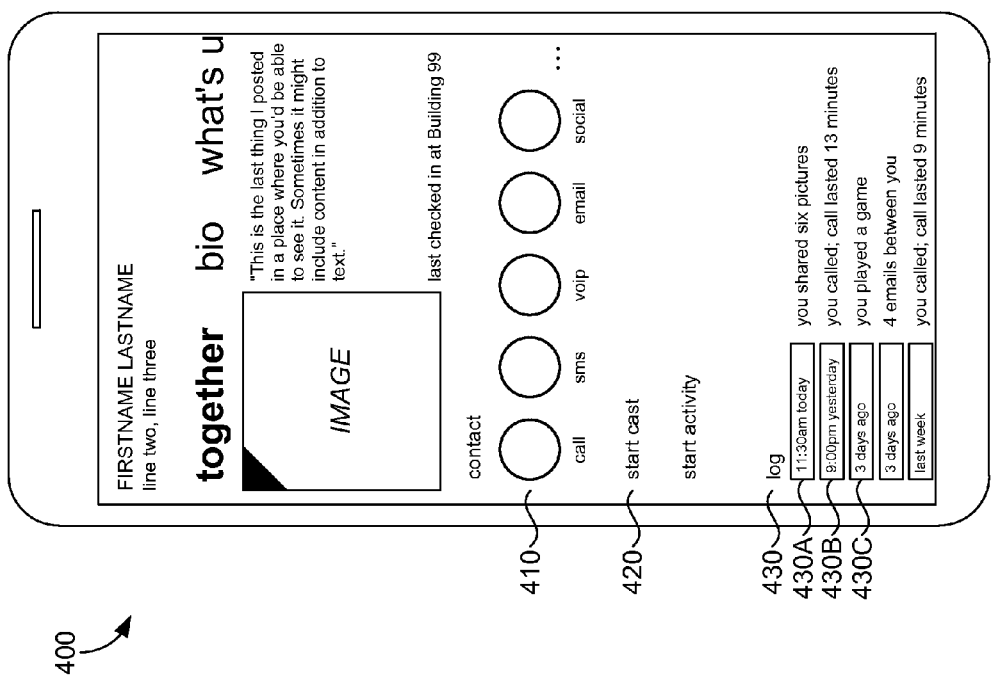

Also shown in FIG. 4 is a history/log area 430. The history 430 illustrates activity between users. Each entry is associated with a time and activity description. For instance, entry 430A occurred at 11:30 a.m. and the description indicates pictures were shared. Entry 430B occurred at 9 p.m. the day before and it was a call that lasted 13 minutes. Entry 430C indicates a game was played 3 days ago. In addition to describing the action, if content is associated with the entry, the content may be available to access. For instance, once the shared space session between User A and user 325 where six pictures were shared (e.g., entry 430A) was terminated, the six pictures that were shared will still be available to User A and user 325 to access at a later time.

Figure 5:
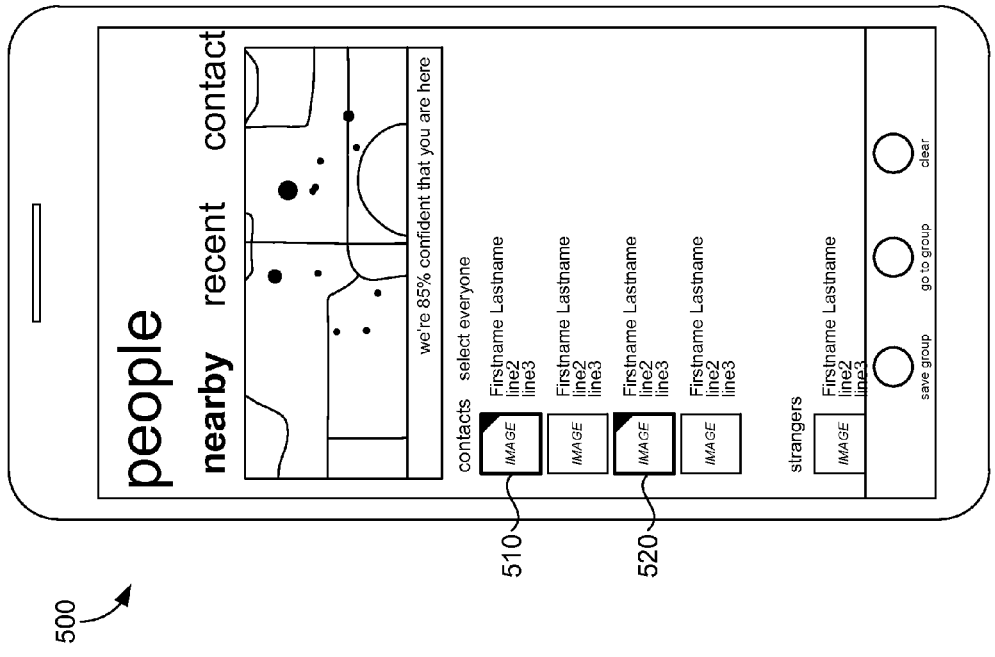
Figure 6:
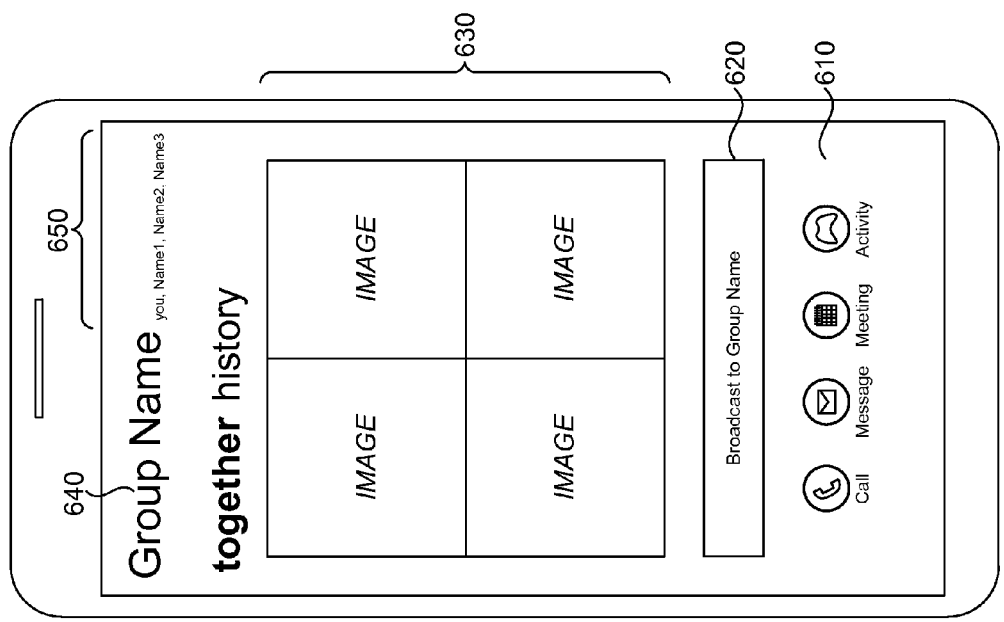

As described with reference to FIG. 4, a user, such as User A, may select multiple users with which to establish a connection. FIG. 5 illustrates an exemplary user interface 500 depicting selection of multiple users. Specifically, user 510 and user 520 have both been selected. A profile card is then created for the "group" and is illustrated in FIG. 6 as user interface 600. A group may be new or pre-existing. A new group is a grouping of users that has not been associated with a group name. New groups are still associated with actions including making calls, sending messages (e.g., emails, text messages, etc.), creating meetings, and viewing activity logs as displayed in the action area 610. Additionally, new groups may broadcast via the shared space session by selecting the broadcast option 620. Each participant of the shared space session is displayed in participant area 630. This may include contacts, strangers, or a combination thereof. As a new group, it may not yet be associated with a group name as indicated by the blank name indicator 640. A participant may enter a group name at any time to establish an existing group. Individual names of participants may also be displayed in identifier area 650. New groups may also lack histories as there is no history to share yet.

Figure 7:
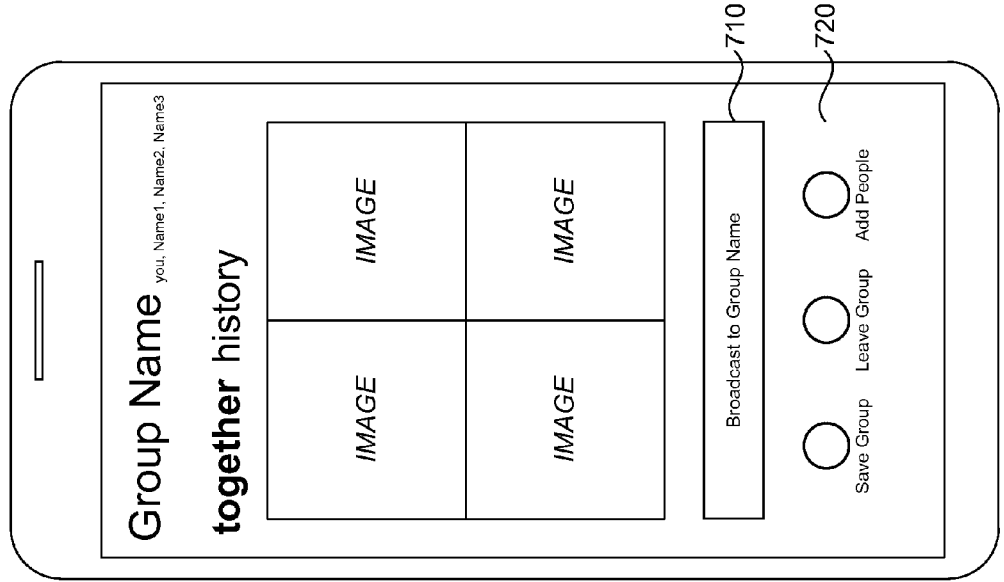

New groups may be saved such that subsequent encounters will be recognized rather than categorized as a new group without previous interaction. FIG. 7 provides an exemplary user interface 700 for saving a group such that it is recognized in the future. Activity bar 720 includes options to save the group, as discussed, leave the group, or add additional people to the group. A group may be saved at any time. As such, a group may be saved and then have additional people added to it. The additional people may be automatically associated with the group and the updated group may be saved.

Figure 8:
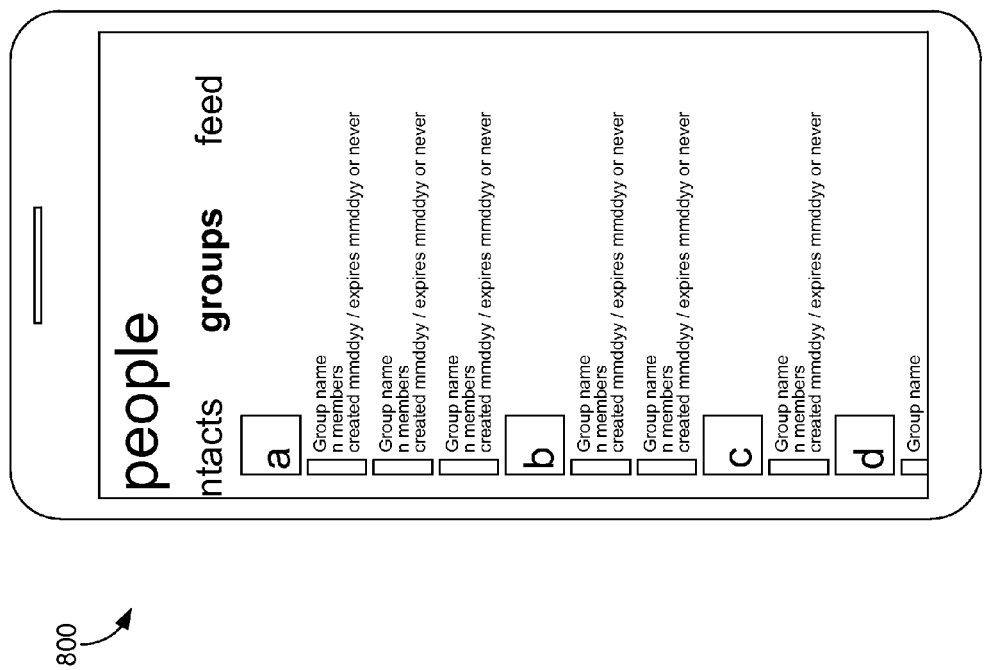

Pre-existing groups are groups that have previous interactions associated therewith. For example, pre-existing groups are associated with a history of activity. A listing of existing groups may be presented to a user as illustrated in user interface 800 of FIG. 8.

Groups may be automatically suggested to a user. As briefly mentioned above, potential connections may be automatically detected based on factors including a user's location, locations of one or more other users in relation to the user's location, a history of interactions, time of day, or the like. For instance, if a history of a group including User A, User B, and User C indicates that the three individuals typically share a connection on Fridays at 1:00 p.m. and a location for each of the three is within a predetermined distance from each other, the group may be suggested to one or more of the users to create the shared space session. Another example may not involve a pre-existing group but, rather, a group that does not typically meet. For instance, assume User A is near Conference Room A that includes User B and User C. When it is detected that Users A, B, and C are near one another and Conference Room A, a suggested connection may be presented to one or more of the users. Furthermore, calendar data may be accessed in order to confirm that a meeting is scheduled to occur in Conference Room A, scheduled to occur between one or more of Users A, B, and C, or the like.

Once a connection is established, any user or participant may access content shared within the connection. Participants may also access any devices that are associated with the shared space session. For example, Conference Room A may be associated with a projector, a PC, telephones, televisions, printers, and the like. When devices are associated with shared space sessions, any participant may be able to access the device(s). Alternatively, security settings may designate that only certain participants may access devices and/or content. In this situation, classes of participants may be implemented where exemplary classes may include presenters and viewers. Viewers may only have the option to view and may not control or connect to devices. Viewers may only be able to access certain content, not all. Presenters, on the other hand, may have access to all content, connect to any devices associated with the connection, and the like.

Additional policies may be implemented that designate those who can share content and those who cannot. For instance, viewers may only be able to view a shared space session and not share or access content associated therewith. Alternative embodiments may provide for an arbitrator of the shared space session. An arbitrator refers to a user that designates and/or enforces policies for a shared space session. A connection may require that only one user shares content at a time or one user talks at a time. An arbitrator ensures that is the case.

Shared space sessions may also be set up so that shared content is not viewed by all participants. Rather, the shared content may simply go to an arbitrator or presenter. For instance, feedback (e.g., questions, comments, etc.) of a lecture or meeting may only be sent to a lead presenter, for example, such that the lead presenter may respond to the feedback, if appropriate.

In addition to various policies to enforce in groups, groups may be clustered based on relatedness or meaningfulness to a user, for example. Relatedness, as used herein, refers generally to similarities between groups. For instance, social groups may be related to one another while work groups are another category. Meetings each Friday that discuss work assignments for the upcoming week may be related and clustered together. When groups are clustered together content shared during the shared space sessions associated with the related groups may be grouped together such that all content is available and associated with each meeting of the group rather than only associated with the specific meeting where it was shared.

Meaningfulness, as used herein, refers generally to importance to a user. This may be designated by a user. A user may, for example, rank social groups much higher than work or school groups. A user may rank a recurring lunch date group higher than a work meeting group, for instance.

Figure 9:
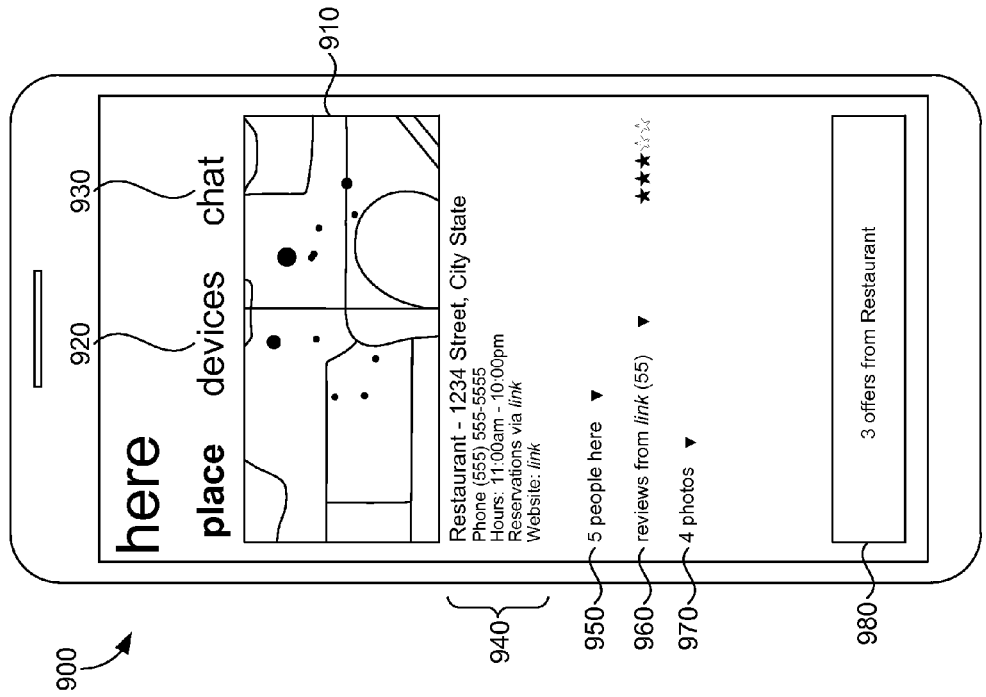

Returning now to the Figures, FIG. 9 provides an exemplary user interface 900 displaying location data. User interface 900 may be displayed upon selection of the map area 310 illustrated in FIG. 3. Upon selection of the map area 310, user interface 900 is displayed and includes map area 910, device link 920, chat link 930, location data area 940, people data area 950, review area 960, additional content area 970, and offers area 980. FIG. 9 may be associated with shared space sessions that are persistent spaces hosted by an entity. For example, a participating restaurant may host a shared space session and share a music playlist with any patron in the restaurant. Other exemplary hosting entities may include libraries, parks, event venues, bars, conference centers, office buildings, malls, and the like.

Figure 10:
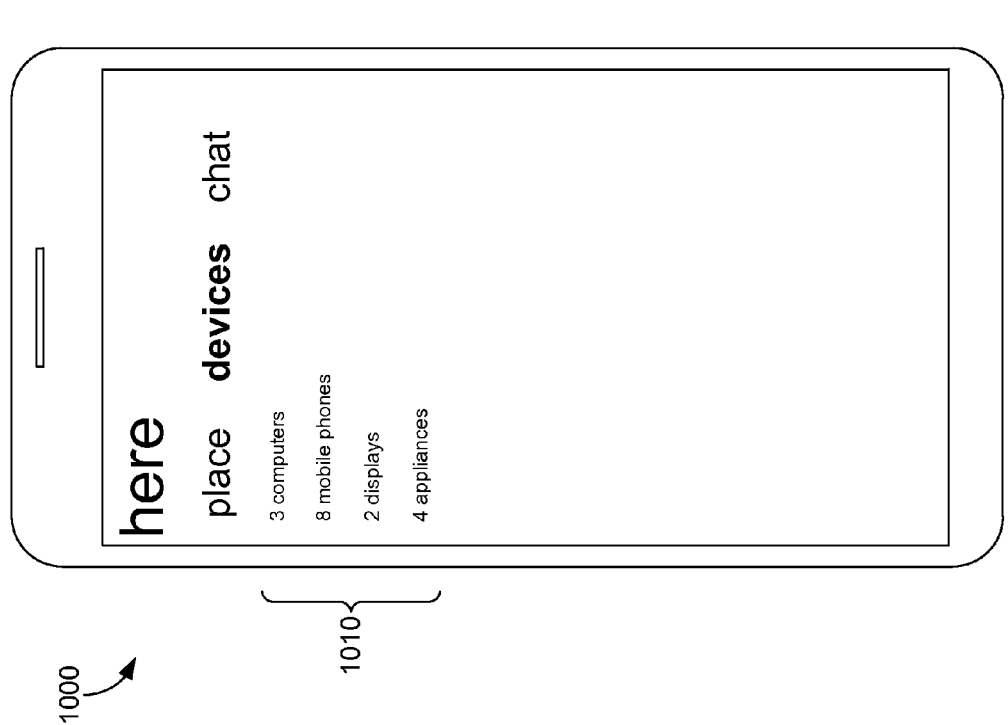

Device link 920 is selectable such that selection thereof may result in display of one or more devices associated with a shared space session. FIG. 10 illustrates this embodiment. User interface 1000 includes the selected device link and one or more devices 1010 associated with the shared space session. Selection of one or more of the devices may result in immediate connection to the selected device or display of additional information regarding the selected device. For instance, device list 1010 includes 3 computers. Rather than connecting to all 3 computers, information regarding each of the three computers may be displayed such that a user can select one of the three in which to connect. Additionally, 4 appliances are listed. It is unlikely that the user already knows what the four appliances are. Selection of the 4 appliances link may display a detailed listing of each of the four appliances. The selected device link 920 may be related to a hosting entity identified in location data area 940. In this instance, a restaurant is hosting a shared space session with devices available for connection.

Figure 11:
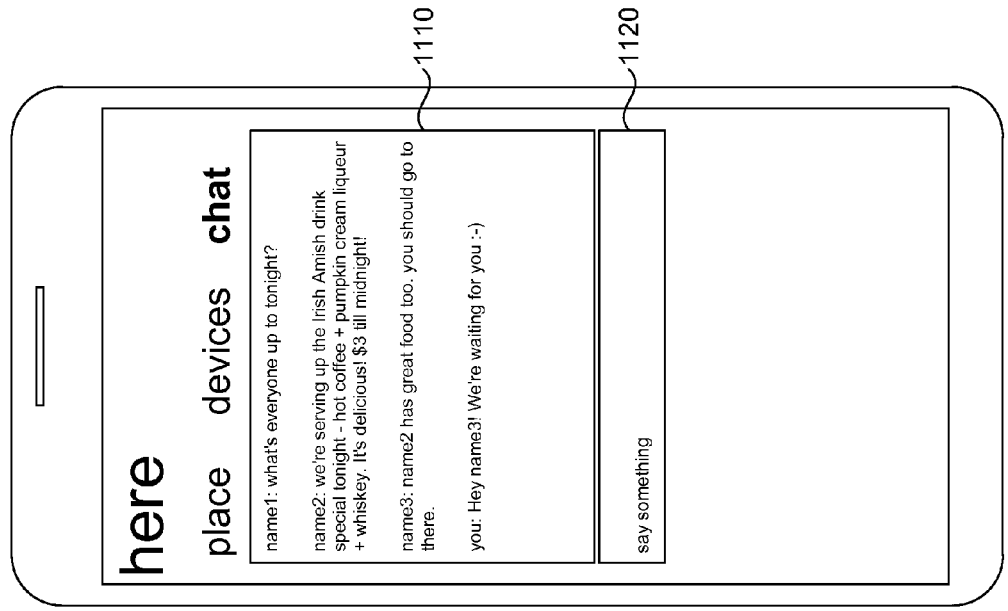

Chat link 930 is also selectable such that selection thereof may result in display of one or more chat areas associated with a shared space session. Continuing with the previous example, the restaurant listed in location data area 940 is hosting the shared space session and, thus, the chat. FIG. 11 provides a chat interface 1100 including a chat display area 1110 and a chat input area 1120. A user may "chat" with other users and/or devices connected to the shared space session by inputting text into chat input area 1120. Users may designate in their privacy settings how their information is displayed in chat interfaces. In particular, users may display their information differently based on the type of shared space session. For instance, in this case, the shared space session is a publicly hosted space with various patrons that may be connected. A user may want to hide their information so that their chat posts are anonymous. Some members of the shared space session may be contacts of the user though. In that case, the user could appear semi-anonymously in that the contacts may be able to view the user's information (name, etc.) while other patrons that are not contacts of the user will not see identifying information. This varies from individually hosted shared space sessions where a user will likely display their information as they possess much more control over who is joining the shared space session.

Returning to FIG. 9, location data area 940 includes identifying information for the hosting entity. People data area 950 includes an indication of how many people are connected to the shared space session. Selection of the indicator may display details of the people connected to the shared space session such as, for example, their names and relationships to the user, if any. Review area 960 includes any available reviews for the location indicated in location data area 940. The reviews may be pulled from various sources and compiled here. Additional content area 970 includes content that may have been shared in the shared space session. Additional content area 970 includes an indicator that four photos have been shared. Selection of the indicator may display the shared content (e.g., the four photos). Finally, offers area 980 may include any offers related to the location of location data area 940. The offers may be coupons, specials, or the like.

Figure 13:
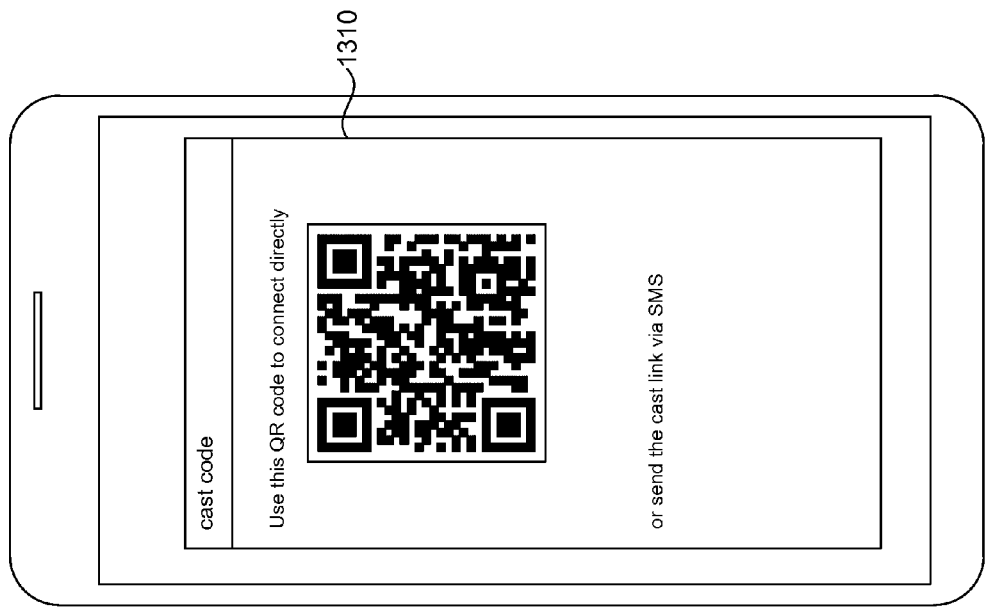
Figure 12:
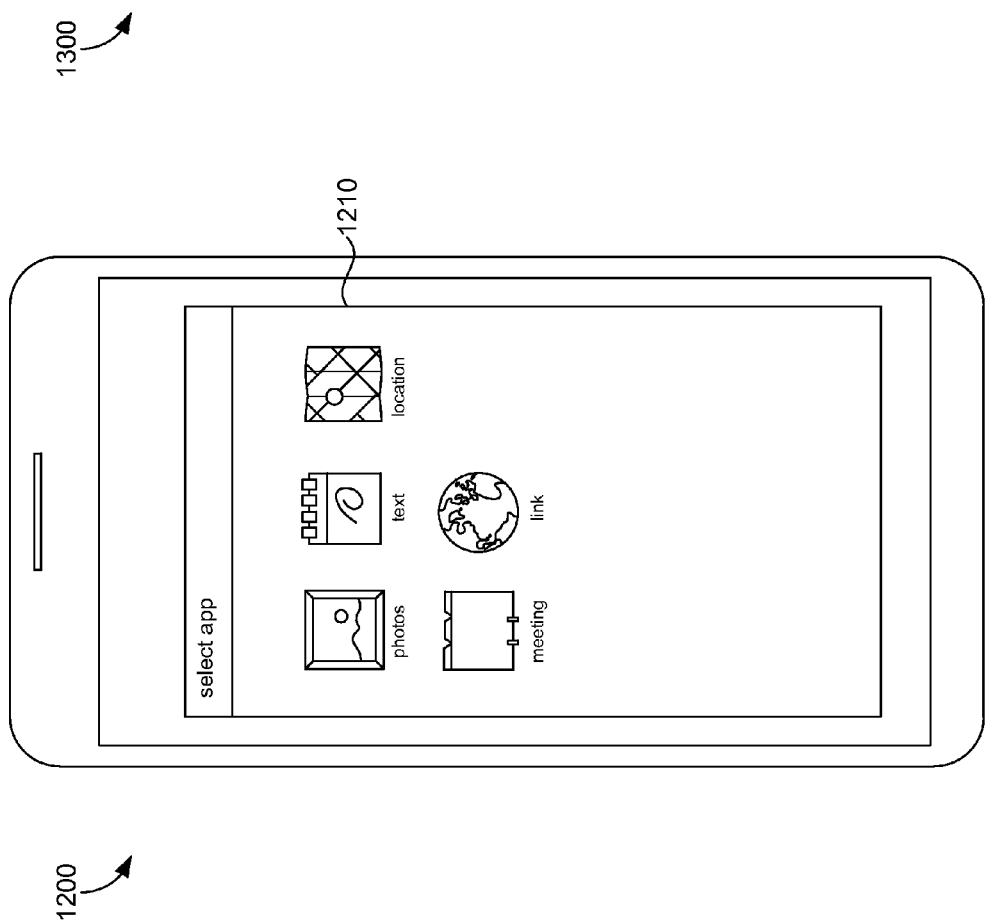

Continuing on with FIG. 12, a user interface 1200 for sharing content is provided. This interface 1200 may be displayed when User A indicates he/she would like to cast content by, for example, selecting the cast content indicator 420 of FIG. 4. The user is then presented with various options regarding what type of content he/she would like to share. Various options are displayed in content selection area 1210 and include photos, text, location data, meeting information, and links. Other content not displayed in content selection area 1210 may be shared. Once the user selects an option, the content is input and shared. For instance, if a user selects photos, a photo gallery (likely from the user device) may be presented to the user such that one or more photos are selected and shared. Had the user selected the text option a text box may be presented such that the desired text may be entered by the user. Selection of the location option may automatically generate the user's location using one or more map services. The meeting option may result in a user's calendar being displayed or may display a blank meeting invitation for the user to complete. Selection of the link option may result in a link input box where a user can input a link he/she wishes to share. Selection of the link option may also generate a link to the shared space session such that User A may share content with additional users. Such a link is presented in FIG. 13. User interface 1300 provides a unique link 1310 to a shared space session. The link in FIG. 13 is a QR code but may also be a selectable URL link that can be sent via text message. Scanning the QR code allows people to directly connect to the shared space session even if they are not a contact of User A and even if they do not have an application on their device for shared space sessions.

Figure 14:
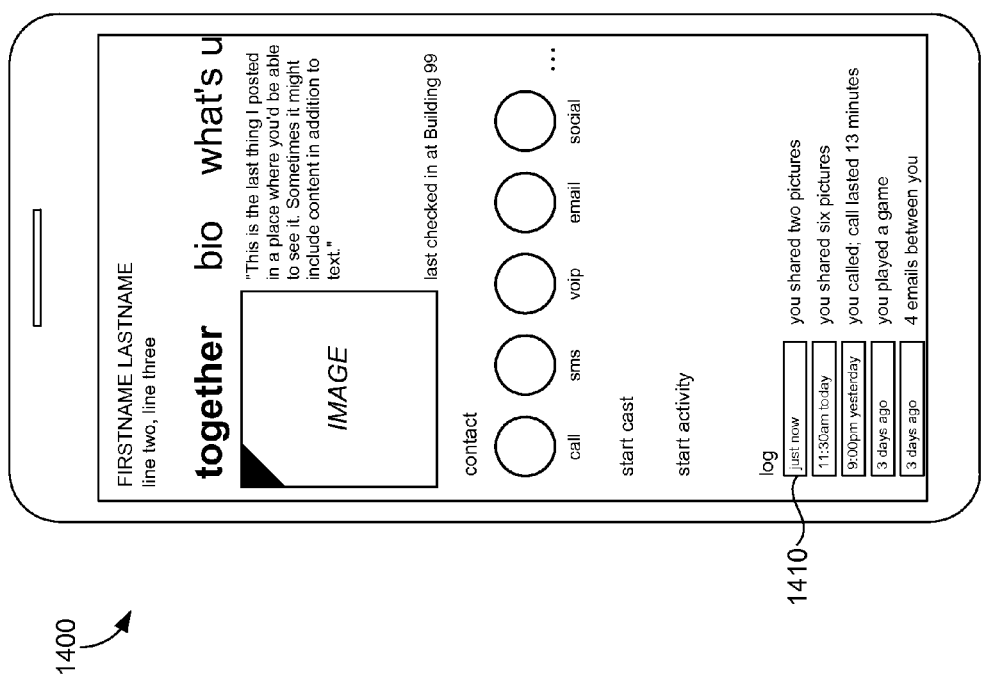

Once the shared space session is over, the activity may be displayed in an updated activity log. FIG. 14 provides user interface 1400 including an updated history 1410 showing that two photos were shared just now. As previously mentioned, the photos may still be available to one or more participants of the shared space session even when the shared space session is over.

Figure 15:
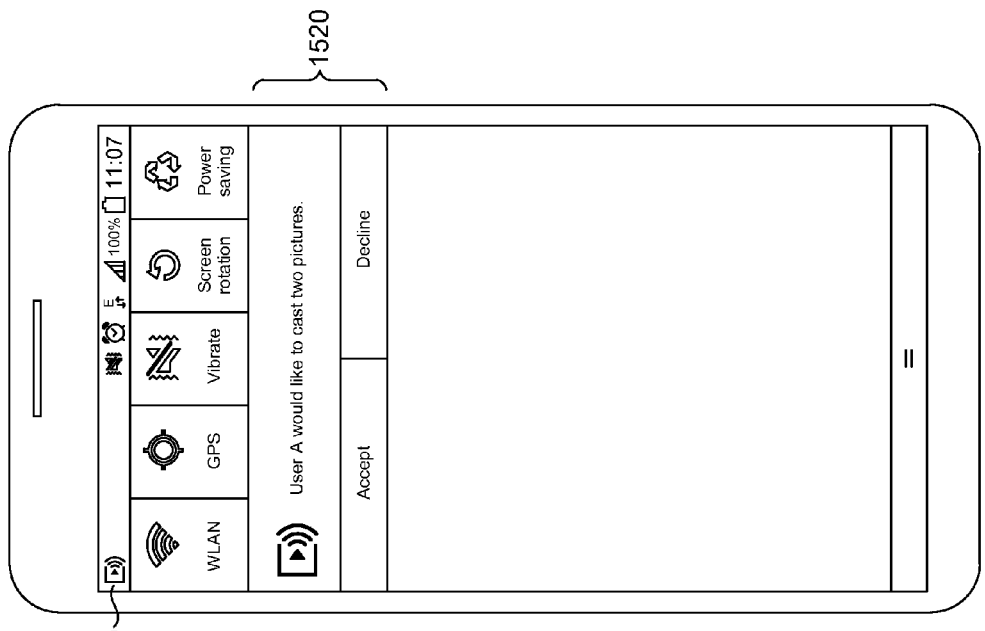

The previous exemplary user interfaces have been from the perspective of User A, or the user initiating the shared space session. FIG. 15 provides a user interface 1500 displaying the invitee's device (hereinafter User B). User B may receive a notification 1510 that User A would like to establish a shared space session. The notification may be detailed as displayed in summary area 1520. Summary area 1520 indicates that User A would like to share two photos. An accept and decline selector is available for User B. If User B selects the decline indicator, the notification disappears from the screen. If User B selects the accept indicator, the shared content is displayed to User B.

Figure 16:
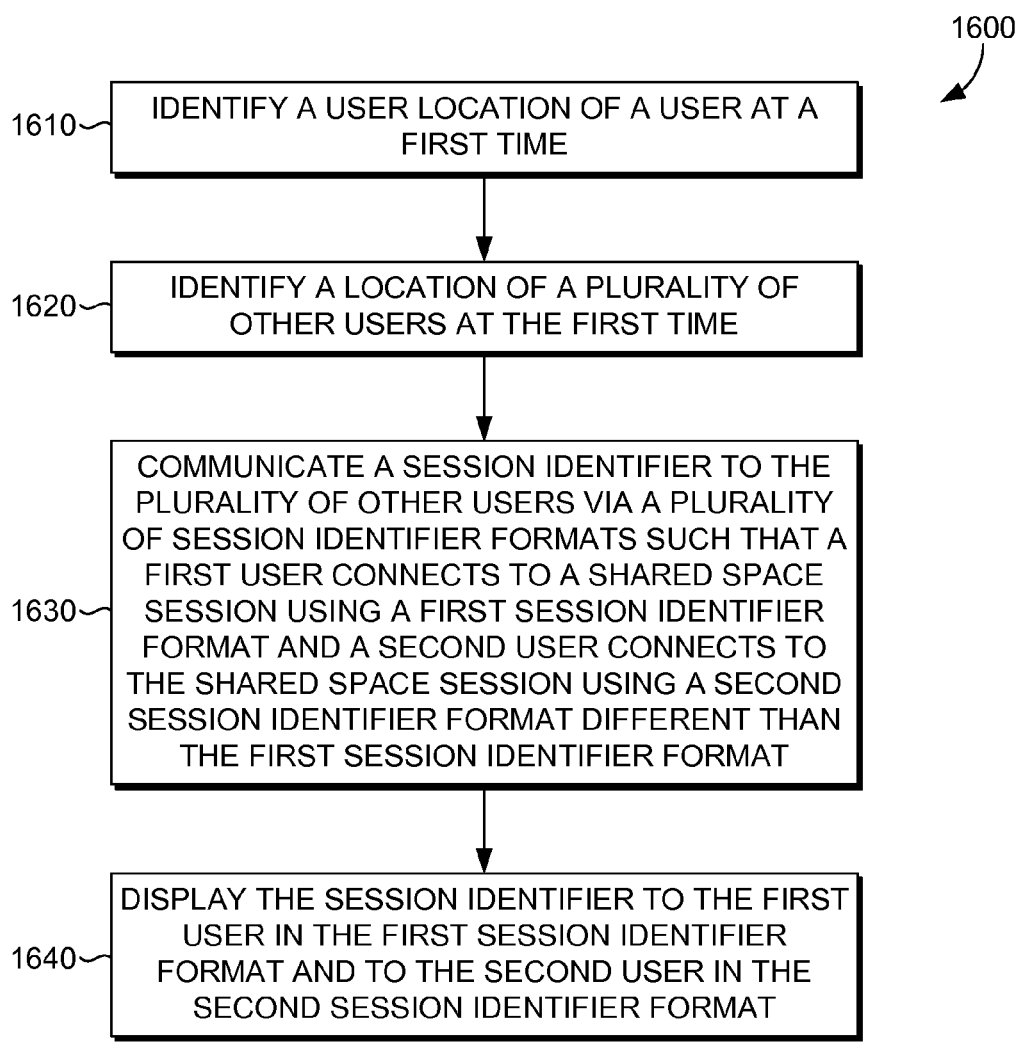
FIG. 16 is a flow diagram of an exemplary method of connecting devices, in accordance with an embodiment of the present invention.

Turning now to FIG. 16, a flow diagram is depicted of an exemplary method 1600 of connecting devices. At block 1600 a user location of an initial user at a first time is identified. A location of a plurality of other users at the first time is identified at block 1620. At block 1630 a session identifier is communicated to the plurality of other users via a plurality of session identifier formats such that a first user connects to a shared space session using a first session identifier format and a second user connects to the shared space session using a second session identifier format different than the first session identifier format. At block 1640 the session identifiers are displayed to the first user in the first session identifier format and to the second user in the second session identifier format. This embodiment allows users to connect to the same shared space session using different technologies. For example, the first session identifier format may be a QR code while the second session identifier format may be a URL link.

Figure 17:
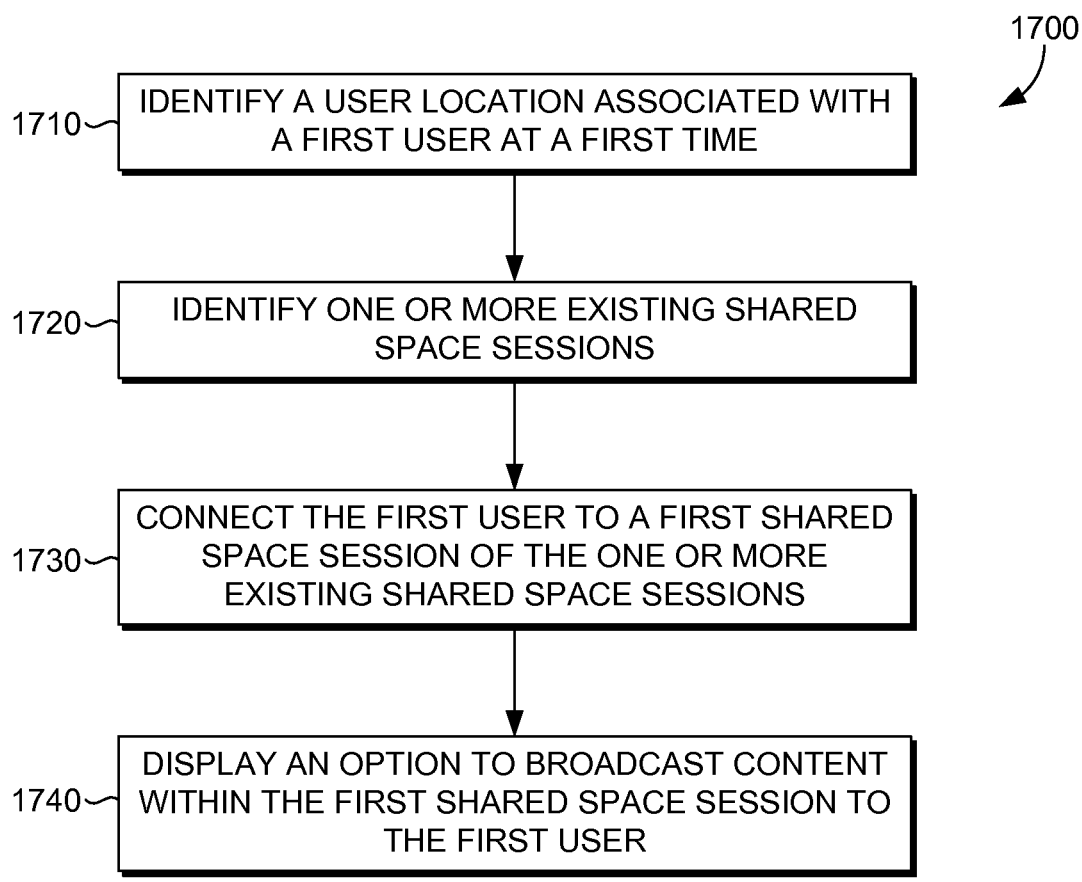
FIG. 17 is a flow diagram of an exemplary method of connecting devices, in accordance with an embodiment of the present invention.

FIG. 17 is a flow diagram depicting an exemplary method 1700 of connecting devices. At block 1710 a user location associated with a first user at a first time is identified while one or more existing shared space sessions is identified at block 1720. The first user is connected, at block 1730, to a first shared space session of the one or more existing shared space sessions. At block 1740 an option to broadcast content within the first shared space session is displayed to the first user.

Figure 18:
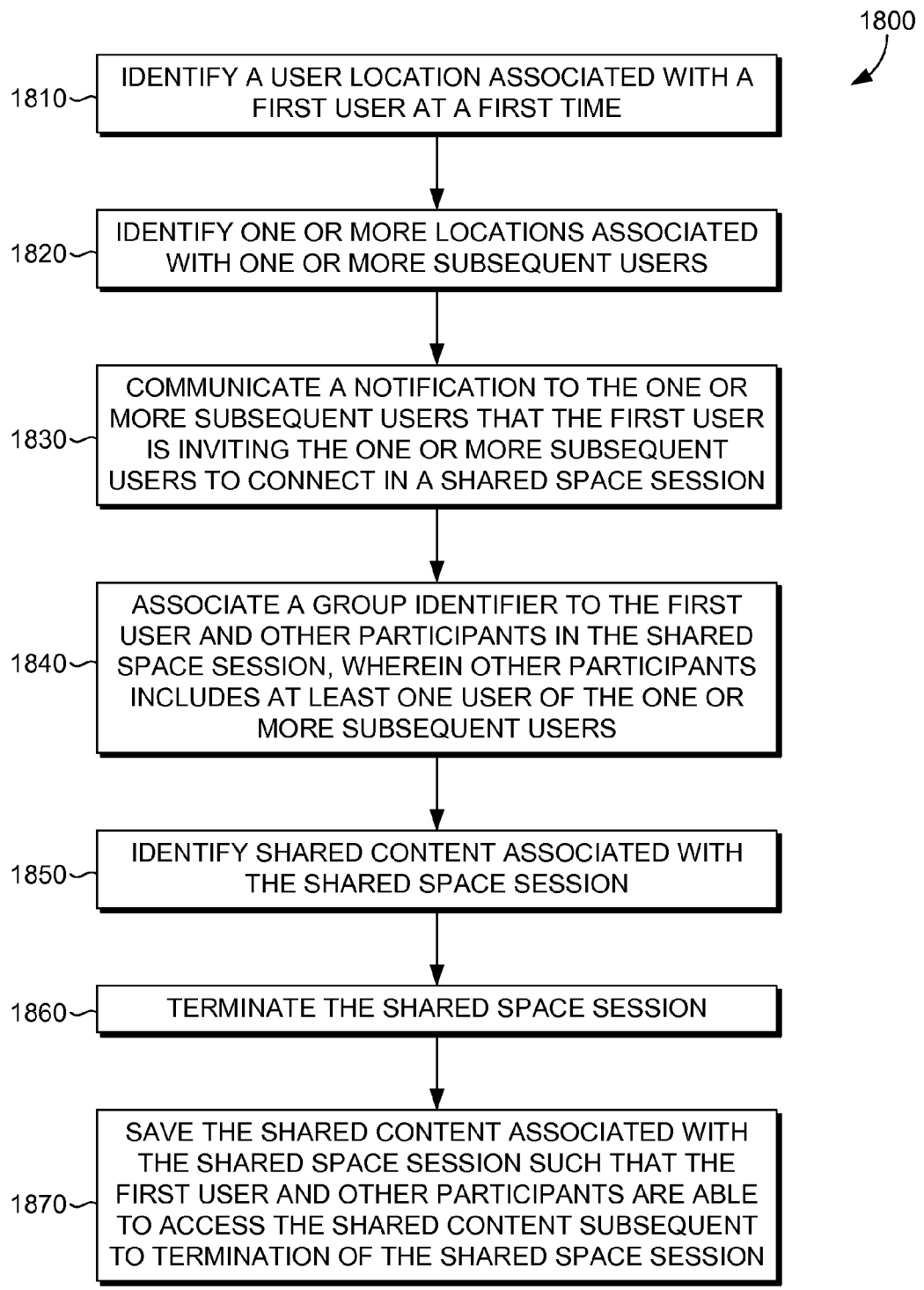
FIG. 18 is a flow diagram of an exemplary method of connecting devices, in accordance with an embodiment of the present invention.

FIG. 18 is a flow diagram of an exemplary method 1800 of connecting devices. At block 1810 a user location associated with a first user at a first time is identified while one or more locations associated with one or more subsequent users is identified at block 1820. A notification is communicated, at block 1830, to the one or more subsequent users that the first user is inviting the one or more subsequent users to connect in a shared space session. At block 1840 a group identifier is associated with the first user and other participants in the shared space session. At block 1850 shared content associated with the shared space session is identified. At block 1860 the shared space session is terminated. At block 1870 the shared content associated with the shared space session is saved such that the first user and other participants are able to access the shared content subsequent to termination of the shared space session.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A computing system comprising:
one or more processors; and
computer storage memory having computer-executable instructions embodied thereon that, when executed by the one or more processors, implement a method of connecting devices, the method comprising:
identifying a user location of a first user at a first time;
identifying a location of a plurality of other users at the first time;
automatically detecting an opportunity to create a shared space session that is not currently existing based on a distance of the user location of the first user at the first time from the location of the plurality of other users at the first time, wherein the opportunity exists when the user location of the first user at the first time is within a predetermined distance from the location of the plurality of other users at the first time;
communicating a first session identifier in a first session identifier format to the first user such that a first user connects to the shared space session using the first session identifier format;
communicating a second session identifier in a second session identifier format different than the first session identifier format to a second user such that the second user connects to the shared space session using the second session identifier format different than the first session identifier format, where the first session identifier and the second session identifier identifies the shared space session, and wherein the shared space session is shared between the first user and the second user, each using different identifier formats to access the shared space session; and
connecting each of the first user and the second user to the shared space session utilizing the first session identifier in the first session identifier format and the second session identifier in the second session identifier format different than the first session identifier format.

2. The system of claim 1, wherein the first session identifier format is a QR code.

3. The system of claim 1, wherein the second session identifier format is a URL link.

4. The system of claim 1, wherein session identifier formats include one or more of QR codes, URL links, Bluetooth connections, and NFC tags.

5. The system of claim 1, wherein the plurality of other users includes at least one contact associated with the first user.

6. The system of claim 1, wherein the plurality of other users includes a stranger, where a stranger is an identified user that is not associated with the first user.

7. A computerized method for connecting devices, the method comprising:
identifying a user location associated with a first user at a first time;
identifying a location of a plurality of other users at the first time;
automatically detecting an opportunity to create a shared space session that is not currently existing based on a distance of the user location of the first user at the first time from the location of the plurality of other users at the first time, wherein the opportunity exists when the user location of the first user at the first time is within a predetermined distance from the location of the plurality of other users at the first time;
communicating a first session identifier in a first session identifier format to the first user such that the first user connects to the shared space session using the first session identifier format;
communicating a second session identifier format different than the first session identifier format to a second user such that the second user connects to the shared space session using the second session identifier format different than the first session identifier format, where the first session identifier and the second session identifier identifies the shared space session, and wherein the shared space session is shared between the first user and the second user, each using different identifier formats to access the shared space session; and
connecting each of the first user and the second user to the shared space session utilizing the first session identifier in the first session identifier format and the second session identifier in the second session identifier format different than the first session identifier format.

8. The method of claim 7, wherein the first session identifier format is a QR code.

9. The method of claim 7, wherein the second session identifier format is a URL link.

10. The method of claim 7, further comprising identifying one or more relationships with other users connected to the shared space session, wherein a relationship exists when the first user has contact information associated with one or more other users.

11. The method of claim 10, wherein the plurality of other users includes at least one contact associated with the first user.

12. The method of claim 10, wherein the plurality of other users includes a stranger, where a stranger is an identified user that is not associated with the first user.

13. The method of claim 7, wherein session identifier formats include one or more of QR codes, URL links, Bluetooth connections, and NFC tags.

14. The method of claim 7, wherein the shared space session includes an option for participants to chat with one another.

15. The method of claim 7, wherein each participant of the shared space session is associated with a location within a predetermined distance from a location of a host of the shared space session.

16. The method of claim 7, wherein the shared space session is associated with one or more devices that may be connected to by the first user.

17. One or more computer-storage hardware devices having computer-executable instructions embodied thereon that, when executed by one or more computing devices, perform a method of connecting devices, the method comprising:
identifying a user location associated with a first user at a first time;
identifying one or more locations associated with one or more subsequent users, wherein the one or more locations are within a predetermined distance from the user location of the first user;
communicating a notification to the one or more subsequent users that the first user is inviting the one or more subsequent users to connect in a shared space session between the first user and the one or more subsequent users;
connecting each of the one or more subsequent users to the shared space session between the first user and the one or more subsequent users via session identifier formats that are different for each user of the one or more subsequent users, wherein a second user is connected to the shared space session utilizing a first session identifier format and a third user is connected to the shared space session utilizing a second session identifier format different than the first session identifier format;
associating a group identifier to the first user and other participants in the shared space session, wherein other participants includes at least one user of the one or more subsequent users;
applying the group identifier to at least one other shared space session between the first user and the other participants;
identifying shared content associated with the shared space session;
terminating the shared space session; and saving the shared content associated with the shared space session such that the first user and the other participants are able to access the shared content subsequent to termination of the shared space session from a saved instance of the shared space session or a shared instance of the at least one other shared space session associated with the group identifier.

18. The devices of claim 17, wherein the notification may be in a format of a QR code, a URL link, a Bluetooth connection, or an NFC connection.

19. The devices of claim 17, wherein the group identifier is automatically identified at a second time after the first time when the first user and the other participants are identified as being within a predetermined distance from one another at the second time, wherein the second time is a same time of day as the first time but on a subsequent day.

20. The devices of claim 17, wherein content includes one or more of text, audio, video, images, and document.

* * * * *